(12) United States Patent
Secinaro (10) Patent No.: US 11,407,498 B2
(45) Date of Patent: Aug. 9, 2022

(54) VORTEX GENERATOR PASSIVE DEPLOYMENT SYSTEM

(71) Applicant: The Boeing Company, Chicago, IL (US)

(72) Inventor: Nathan Alphonse Secinaro, Seattle, WA (US)

(73) Assignee: The Boeing Company, Chicago, IL (US)

( * ) Notice: Subject to any disclaimer, the term of this patent is extended or adjusted under 35 U.S.C. 154(b) by 420 days.

(21) Appl. No.: 16/557,987

(22) Filed: Aug. 30, 2019

(65) Prior Publication Data
US 2021/0061449 A1    Mar. 4, 2021

(51) Int. Cl.
*B64C 23/06*    (2006.01)

(52) U.S. Cl.
CPC .......... *B64C 23/06* (2013.01); *B64C 2230/20* (2013.01)

(58) Field of Classification Search
CPC ..... B64C 23/06; B64C 2230/20; B64C 13/16; B64C 23/04; F42B 10/14
See application file for complete search history.

(56) References Cited

U.S. PATENT DOCUMENTS

| | | | |
|---|---|---|---|
| 5,992,796 A * | 11/1999 | Smith | B64C 5/02 244/45 A |
| 6,427,948 B1 | 8/2002 | Campbell | |
| 6,685,143 B1 * | 2/2004 | Prince | F42B 10/14 244/203 |
| 7,878,457 B2 | 2/2011 | Narramore | |
| 9,638,176 B2 | 5/2017 | Shivashankara et al. | |
| 9,789,956 B2 | 10/2017 | Bordoley et al. | |
| 2008/0217485 A1 | 9/2008 | Ikeada | |
| 2014/0271187 A1 * | 9/2014 | Baker | F03D 7/0224 416/1 |

FOREIGN PATENT DOCUMENTS

| | | |
|---|---|---|
| EP | 3150486 A1 | 5/2017 |
| WO | 9950141 A1 | 10/1999 |

* cited by examiner

*Primary Examiner* — Richard R. Green
*Assistant Examiner* — William L Gmoser
(74) *Attorney, Agent, or Firm* — Kolisch Hartwell, P.C.

(57) ABSTRACT

A system for passive deployment of a vortex generator is disclosed, including a housing mounted at a fixed location relative to an airfoil structure and a piston contained in the housing. A vortex generator is moveably mounted adjacent an exterior surface of the airfoil structure, and is moveable between a stowed position inside the airfoil structure and a deployed position outside the airfoil structure. The piston is configured to drive the vortex generator between the stowed position and the deployed position in response to a pressure differential between a first airstream over a first surface of the airfoil structure and a second airstream over a second surface of the airfoil structure.

20 Claims, 10 Drawing Sheets

VORTEX GENERATOR PASSIVE DEPLOYMENT SYSTEM

BACKGROUND

Vortex generators are a common aerodynamic device used to delay flow separation. On aircraft, flow separation can cause non-optimal flight conditions when a lifting surface is operating at low speeds associated with takeoff and approach to landing. Vortex generators improve safety and efficiency of such low-speed flight by re-energizing flow over the lifting surface and preventing stall until high angles of attack. However, at cruising speeds, vortex generators cause drag and can negatively affect efficiency. Deployable vortex generators are a promising option, but current deployment systems require remote control systems, electrical power, and/or expensive materials. A simple and reliable system for deploying vortex generators only when needed is desirable.

SUMMARY

The present disclosure provides systems, apparatuses, and methods relating to passive deployment of a vortex generator. In some examples, a system for passive deployment of a vortex generator may include a housing mounted at a fixed location relative to an airfoil structure and a piston contained in the housing. A vortex generator may be moveably mounted adjacent an exterior surface of the airfoil structure, and may be moveable between a stowed position inside the airfoil structure and a deployed position outside the airfoil structure. The piston may be configured to drive the vortex generator between the stowed position and the deployed position in response to a pressure differential between a first airstream over a first surface of the airfoil structure and a second airstream over a second surface of the airfoil structure.

In some examples, an aircraft may include an airfoil structure connected to a fuselage. A housing may be mounted at a fixed location relative to the airfoil structure, with a piston contained in the housing. The aircraft may further include a vortex generator moveably mounted adjacent an exterior surface of the airfoil structure, and moveable between a stowed position inside the airfoil structure and a deployed position outside the airfoil structure. The piston may be configured to drive the vortex generator between the stowed position and the deployed position in response to a pressure differential between a first airstream over a first surface of the airfoil structure and a second airstream over a second surface of the airfoil structure.

In some examples, a method of deploying a vortex generator may include sending a pressure differential between a first airstream over a first surface of an airfoil structure and a second airstream over a second surface of the airfoil structure. The method may further include passively moving a vortex generator from a stowed position to a deployed position in the first airstream, in response to sending a selected first threshold value of the pressure differential.

Features, functions, and advantages may be achieved independently in various examples of the present disclosure, or may be combined in yet other examples, further details of which can be seen with reference to the following description and drawings.

DETAILED DESCRIPTION

Various aspects and examples of a system for passive deployment of a vortex generator, as well as related methods, are described below and illustrated in the associated drawings. Unless otherwise specified, a system in accordance with the present teachings, and/or its various components may, but are not required to, contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed examples. The following description of various examples is merely illustrative in nature and is in no way intended to limit the disclosure, its application, or uses. Additionally, the advantages provided by the examples described below are illustrative in nature and not all examples provide the same advantages or the same degree of advantages.

This Detailed Description includes the following sections, which follow immediately below: (1) Overview; (2) Examples, Components, and Alternatives; (3) Illustrative Combinations and Additional Examples; (4) Advantages, Features, and Benefits; and (5) Conclusion. The Examples, Components, and Alternatives section is further divided into subsections A through E, each of which is labeled accordingly.

Overview

In general, a system for passive deployment of a vortex generator in accordance with the present teachings includes a piston configured to urge the vortex generator between a stowed position and a deployed position. The stowed position may be interior to an airfoil structure, and the deployed position may be on or at an exterior surface of the airfoil structure. In some examples, the stowed position may be a position in which the vortex generator does not alter the aerodynamic properties of the airfoil, and the deployed position may be a position in which the vortex generator alters the aerodynamic properties of the airfoil structure. The piston is actuated at least in part by a pressure differential between two surfaces of the airfoil structure. As a consequence, the system may respond to an angle of attack of the airfoil structure.

The airfoil structure may comprise any structure moving through a fluid at a varying angle of attack which can experience boundary layer flow separation. The airfoil structure may also be referred to as a lifting surface, an aerodynamic structure, a hydrodynamic structure, and/or an airfoil. For example, the airfoil may be a lifting surface on an aircraft such as an airplane wing or stabilizer, a fuselage, and/or a helicopter rotor blade. For another example, the airfoil may be a structure on stationary equipment such as a turbine blade or pump rotor, and/or on a vehicle such as a car or watercraft.

The vortex generator may be any aerodynamic device configured to delay local flow separation from the airfoil. For example, the vortex generator may be a small vane extending perpendicular to the exterior surface of the airfoil. Such a vane may have any appropriate shape and/or orientation. For example, the vortex generator may be rectangular or triangular, and may be disposed at any angle relative to fluid flow over the exterior surface. The vortex generator may be one of a plurality of vortex generators on the exterior surface and/or airfoil, which may be disposed in any appropriate pattern and/or groupings.

At any point in time, the airfoil may have an angle of attack relative to a flow direction of air or fluid. A difference between the pressure and/or pressure coefficient at a lower surface and the pressure and/or pressure coefficient at an upper surface of the airfoil may depend on the angle of attack. More specifically, as the angle of attack increases, the pressure differential between the lower surface and the pressure at the upper surface may increase. Consequently, lift may increase as the angle of attack increases. This relationship may persist up to a critical angle of attack, also known as a stall angle of attack, past which flow separation causes the lift and the pressure differential to decrease.

The piston of the passive deployment system may be configured to deploy the vortex generator at a first selected angle of attack. That is, the piston may be configured to deploy the vortex generator in response to a first value of the pressure differential corresponding to a desired angle of attack. The desired angle of attack may be selected according to properties and operational parameters of the airfoil. For example, if the airfoil is the wing of an aircraft, the desired angle of attack may be at a lowest end of a range of angles of attack typically experienced by the wing during takeoff and/or landing of the aircraft.

In general, the desired angle of attack may be selected to be close to but less than the critical angle of attack. For example, if the critical angle of attack of an aircraft is approximately 10 degrees, the desired angle of attack may be selected to in the range of 7 to 9 degrees. For instance, the desired angle of attack may be selected to be 8 degrees.

The piston may also be configured to stow the vortex generator at a second selected angle of attack. In some examples, the second selected angle of attack may be close to, or the same as the first selected angle of attack. In such an example, the piston may deploy the vortex generator as the angle of attack increases above the selected angle, and then re-stow the vortex generator at the angle of attack decreases below the selected angle. Stowing the vortex generators at lower angles of attack may reduce drag and improve operational efficiency of the airfoil.

Figure 1:
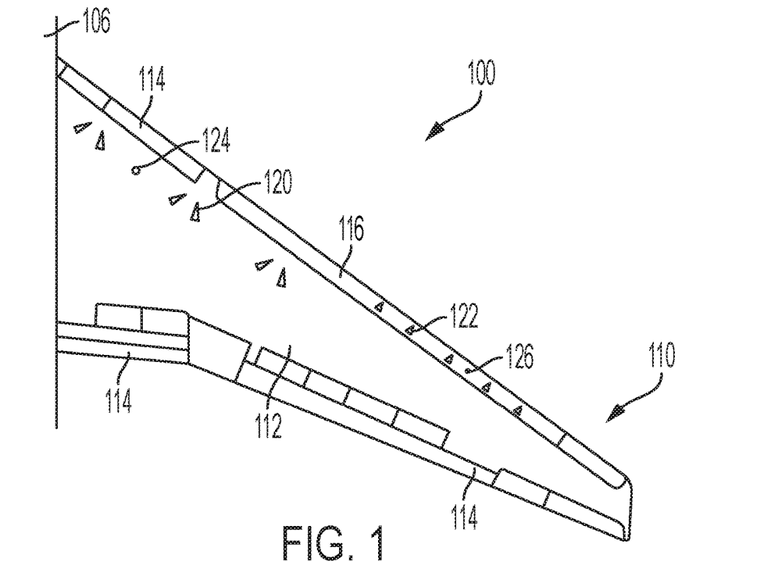
FIG. 1 is a schematic diagram of an illustrative aircraft wing with vortex generators.
Figure 2:
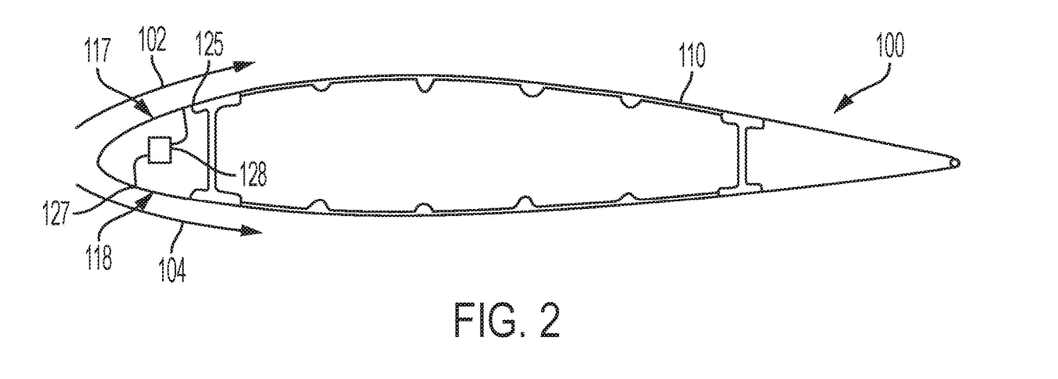
FIG. 2 is a schematic diagram of a cross-section of the wing of FIG. 1.
Figure 3:
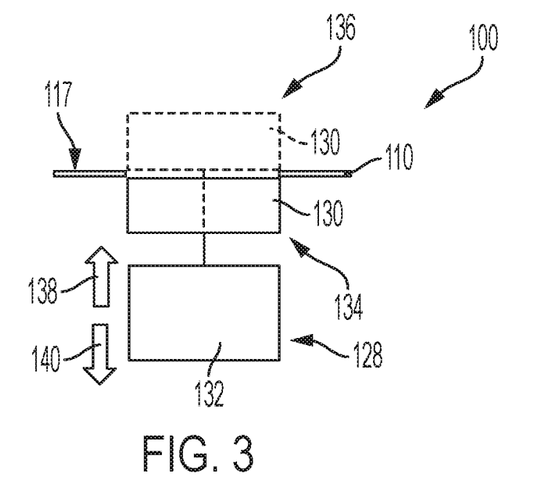
FIG. 3 is a schematic diagram of an illustrative vortex generator passive deployment system in accordance with aspects of the present disclosure.

FIGS. 1-3 are schematic diagrams of an illustrative passive deployment system 100. FIG. 1 depicts an aircraft wing 110 extending from a fuselage 106. The wing has a fixed wing body 112 and control surfaces 114, including a leading edge flap 116. System 100 includes a first plurality of vortex generators 120, mounted on wing body 112. The system further includes a second plurality of vortex generators 122. The vortex generators of the first plurality 120 are arranged in pairs, each pair of vortex generators aligned in an approximate V-shape. The vortex generators of the second plurality 122 are evenly spaced and normal to the leading edge of the wing. In general, system 100 may include any number of vortex generators in any groupings or patterns, and in any location on an airfoil structure such as wing 110.

In the present example, the first plurality of vortex generators 120 are actuated by a first common pressure source and the second plurality of vortex generators 122 are actuated by a second common pressure source. More specifically, system 100 includes a first pair of pressure ports 124 and a second pair of pressure ports 126, of which only the upper pressure port is depicted in FIG. 1. Each pair of pressure ports communicates the pressure differential between upper and lower surfaces of the wing to one or more actuators. In some examples, each vortex generator may be actuated by a separate pair of pressure ports, all vortex generators may be actuated by a single pair of pressure ports, and/or pressure may be supplied to system 100 in any appropriate manner.

FIG. 2 depicts a schematic cross-section of wing 110, including an upper pressure port 125 and a lower pressure port 127 of second pair of pressure ports 126. First pair of pressure ports 124 may similarly include an upper and a lower pressure port. Wing 110 has an exterior surface, including an upper surface 117 and a lower surface 118. As the wing moves through the air, a first airstream 102 passes over the upper surface and a second airstream 104 passes over the lower surface. Each of the upper and lower pressure ports may include a small hole or opening in the exterior surface of wing 110, such as the outer skin of the wing. Upper pressure port 125 may be open to first airstream 102 and lower pressure port 127 may be open to second airstream 104.

For examples of system 100 on an airfoil other than an aircraft wing, the airfoil may not have a horizontal orientation. For instance, a wind turbine blade may maintain a substantially vertical orientation. In such examples, the exterior surface of the airfoil may include first and second opposing surfaces. Each pair of pressure ports may include a port on the first surface and a port on the second surface. In the present disclosure, description of direction and/or location including reference to "upper" and "lower" may be understood in the context of such airfoils to refer to directions and locations relative to the first and second exterior surfaces.

System 100 includes an actuator mechanism 128 for each vortex generator of the first and second pluralities 120, 122. One actuator mechanism is depicted in FIG. 2. Each actuator mechanism 128 is connected to upper pressure port 125 and lower pressure port 127, either directly or indirectly. Connection may include tubing, hydraulic lines, and/or any effective means of transferring fluid pressure from the port to the actuator mechanism.

Pressure may vary chord-wise across wing 110. Pairs of pressure ports 124, 126 may be disposed at the same chord-wise location, or different locations. Similarly, upper and lower pressure ports 125, 127 of each pair may be disposed at the same chord-wise location, or different locations as shown in FIG. 2. The chord-wise location of the pressure ports may be selected according to properties of wing 110, the airfoil structure, and/or system 100. For example, the relative position of the chord-wise locations of the upper and lower pressure ports 125, 127 may depend on a camber of wing 110. For another example, a chord-wise location of the pressure ports may be selected according to actuation requirements of the actuator mechanism 128.

FIG. 3 is a schematic diagram of actuator mechanism 128 for a vortex generator 130 of system 100. The actuator includes a piston 132, which is mechanically linked to the vortex generator. For example, the vortex generator may be fixed to a shaft of the piston. Piston 132 is configured to urge vortex generator 130 between a stowed position 134 and a deployed position 136. In the stowed position, vortex generator 130 is below the outer skin of wing 110, interior to the wing. In the deployed position, vortex generator 130 extends above the outer skin of wing 110, exterior to the wing.

Vortex generator 130 may move between the stowed and deployed positions through an aperture in the outer skin of the wing. In some examples, flexible seals or other structures may be included in the outer skin of the wing to at least partially obscure the aperture when vortex generator 130 is in stowed position 134. Vortex generator 130 and/or the outer skin may be configured such that the vortex generator partially or completely obscures the aperture when vortex generator 130 is in deployed position 136.

Actuator mechanism 128 is configured to apply two forces to piston 132, a pressure differential force 138 and a biasing force 140. The pressure differential force may result from pressure communicated from upper pressure port 125 and lower pressure port 127, as shown in FIG. 2. The pressure differential force may therefore correspond to the pressure differential between the upper and lower surfaces of wing 110. Biasing force 140 may oppose pressure differential force 138. The biasing force may be applied by any effective mechanism, including but not limited to spring bias, elastic material, and/or compressible fluid. Biasing force 140 may be configured to tune the response of piston 132 to pressure differential force 138. For example, biasing force 140 may prevent movement of vortex generator 130 until a threshold value of pressure differential force 138 is reached. For another example, biasing force 140 may reduce the displacement distance of vortex generator 130 in response to a change in pressure differential force 138.

In some examples, actuating mechanism 128 may include a trigger device to prevent movement of piston 132 in response to pressure differential force 138 until a threshold value of pressure differential force 138 is reached. That is, until a threshold value of the pressure differential between the upper and lower surfaces of wing 110 is reached. For example, actuating mechanism 128 may include a latch configured to release at a selected force threshold.

Examples, Components, and Alternatives

The following sections describe selected aspects of exemplary systems for passive deployment of a vortex generator as well as related apparatus and/or methods. The examples in these sections are intended for illustration and should not be interpreted as limiting the entire scope of the present disclosure. Each section may include one or more distinct examples, and/or contextual or related information, function, and/or structure.

A. Illustrative Passive Deployment System

Figure 4:
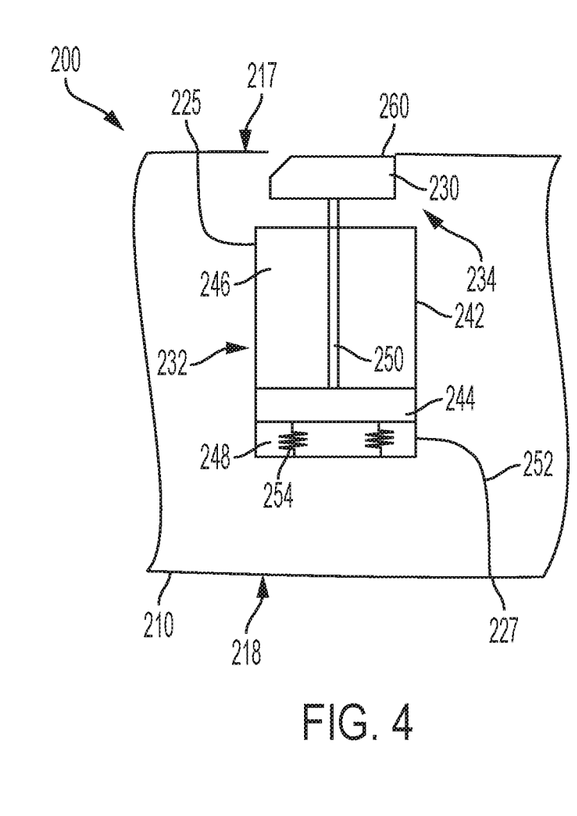
FIG. 4 is a schematic diagram of another illustrative vortex generator passive deployment system as described herein, with a vortex generator in a stowed position.
Figure 5:
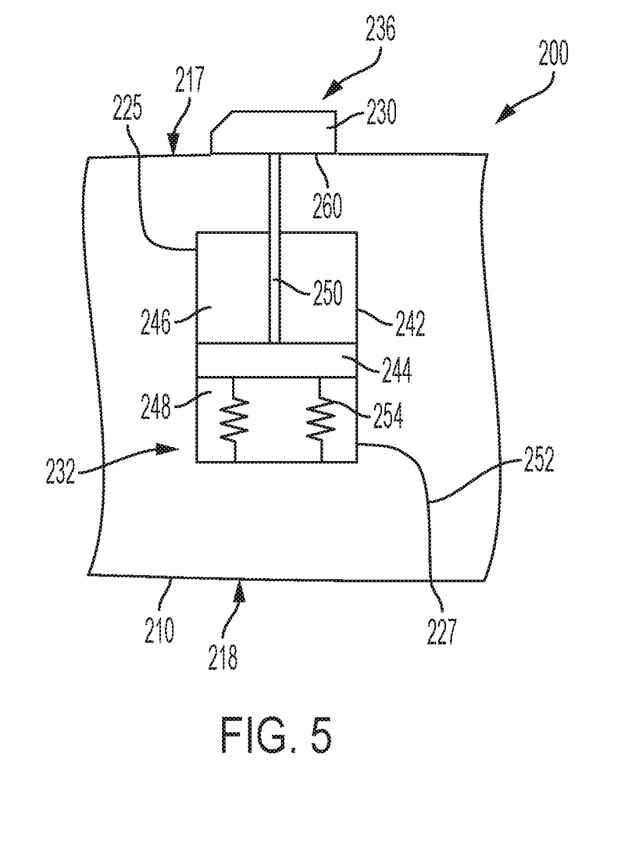
FIG. 5 is a schematic diagram of the system of FIG. 4, with the vortex generator in a deployed position.

As shown in FIGS. 4-5, this section describes an illustrative vortex generator deployment system 200. System 200 is an example of a passive deployment system as described above. System 200 is configured to passively deploy a vortex generator 230 on an airfoil 210. The system includes a piston 232 with a housing 242 and a dividing seal 244. The seal divides an interior cavity of the housing into a first chamber 246 and a second chamber 248, and is configured to move within the housing while maintaining an airtight seal between the two chambers.

Housing 242 may be any appropriate size and shape. For example, the housing may be a hollow aluminum or composite cylinder. Preferably, the housing may be light-weight and compact. Properties of housing 242 such as cross-sectional area may be selected according to desired response to pressure and/or to tune system 200. Housing 242 may be fixed relative to airfoil 210. For example, the housing may be mounted to an internal structure of the airfoil.

Dividing seal 244 may comprise any appropriate material, and may separate first chamber 246 and second chamber 248 by any effective means. For example, the seal may comprise a disc conforming to interior walls of the housing in a substantially airtight manner. Dividing seal 244 may be configured to move freely within housing 242 apart from biasing springs 254.

Springs 254 are configured to exert a position-dependent force on dividing seal 244. The springs are disposed in second chamber 248 and urge the seal to return toward a lower end of housing 242, reducing the size of second chamber 248 relative to first chamber 246. Each spring is fixed to the housing at a first end, and to dividing seal 244 at a second end.

Dividing seal 244 is mechanically linked to vortex generator 230. In the present example, piston 232 includes a rod 250. The rod is fixed to dividing seal 244 at a proximal end and fixed to vortex generator 230 at a distal end. Rod 250 extends through first chamber 246 and out of an aperture in housing 242. The aperture may include a seal, such that first chamber 246 remains airtight and movement of rod 250 is unimpeded.

As dividing seal 244 moves in housing 242, vortex generator 230 may move in response. Piston 232 may therefore move the vortex generator between a stowed position 234, as shown in FIG. 4, and a deployed position 236, as shown in FIG. 5. Vortex generator 230 may move between positions, from an interior of airfoil 210 to the exterior of the airfoil, through an aperture 260 in upper surface 217.

Each of the first and second chambers 246, 248 is in fluid communication with the exterior of airfoil 210. The airfoil has an upper surface 217 and a lower surface 218. An upper pressure port 225 is formed in upper surface 217, through a skin of the airfoil. The upper pressure port is connected to first chamber 246 of piston 232. A lower pressure port 227 is formed in lower surface 218, through the skin of the airfoil. The lower pressure port is connected to second chamber 248 of the piston. In the present example, each pressure port is connected by tubing 252. As a result, first chamber 246 is in fluid communication with an upper airstream proximate upper surface 217 and second chamber 248 is in fluid communication with a lower airstream proximate lower surface 218.

Air pressure at upper surface 217 of airfoil 210 may differ from air pressure at lower surface 218 of the airfoil. More specifically, pressure at the upper surface may be less than pressure at the lower surface while the airfoil is subject to lift. Accordingly, dividing seal 244 may experience a force resulting from the pressure differential. The pressure differential force may urge dividing seal 244 in opposition of springs 254, and toward an upper end of housing 242. Therefore, the pressure differential force may urge vortex generator 230 from stowed position 234 to deployed position 236.

Springs 254 may be configured to retain vortex generator 230 in stowed position 234 until airfoil 210 reaches a first selected angle of attack. More specifically, a strength or spring coefficient of springs 254 may be selected such that the pressure differential force must reach a first threshold value in order to overcome the spring bias and move vortex generator 230. The threshold value may correspond to a pressure differential expected at the first selected angle of attack.

When the first selected angle of attack is reached, and the corresponding pressure differential applied to dividing seal 244, vortex generator 230 may immediately begin moving from the stowed position to the deployed position. The vortex generator may complete the move between positions as the angle of attack continues to increase. The vortex generator may reach the deployed position at a second selected angle of attack, corresponding to a second threshold value of the pressure differential force.

Once the vortex generator has reached the deployed position, piston 232 may hold the vortex generator in the deployed position until the angle of attack begins to decrease. The piston may be configured to prevent further movement of the vortex generator beyond the deployed position, and constant or increasing pressure differential force may therefore hold the vortex generator in the deployed position. For example, a limiter such as a rim inside housing 242 may prevent further upward motion of dividing seal 244. For another example, springs 254 may be configured to prevent additional upward motion of the dividing seal.

Below the first selected angle of attack, the vortex generator may be retained in the stowed position. Between the first and second selected angles of attack, the vortex generator may move between positions as the angle of attack varies. Above the second selected angle of attack, the vortex generator may be retained in the deployed position. The first and second angles of attack may be selected according to specifics of the application. For example, an aircraft having a critical or stall angle of attack of 10 to 12 degrees may have a first selected angle of attack of 7 degrees and second selected angle of attack of 9 degrees. System 100 may be tuned to the selected angles of attack by varying strength of springs 254 and/or chord-wise location of pressure ports in upper surface 217 and lower surface 218, for example.

B. Illustrative Passive Deployment System with Detents

Figure 6:
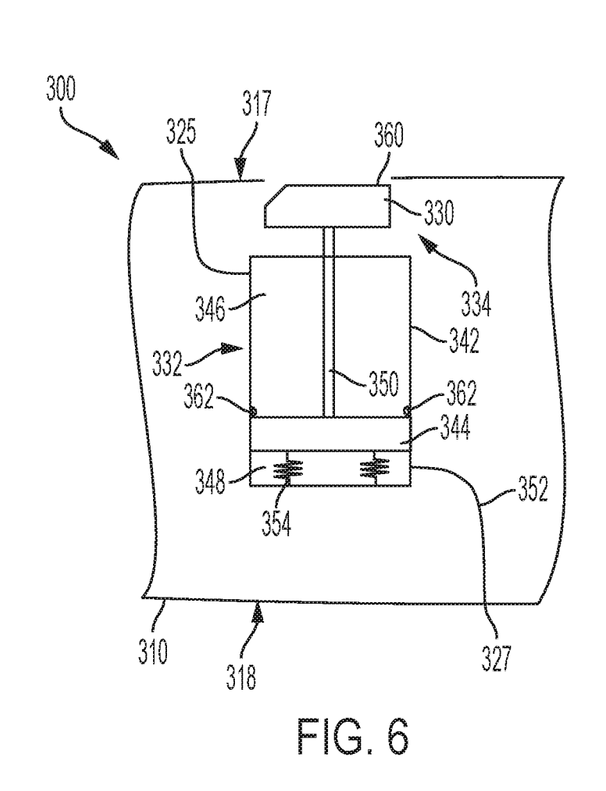
FIG. 6 is a schematic diagram of another illustrative vortex generator passive deployment system as described herein, in a latched mode.
Figure 7:
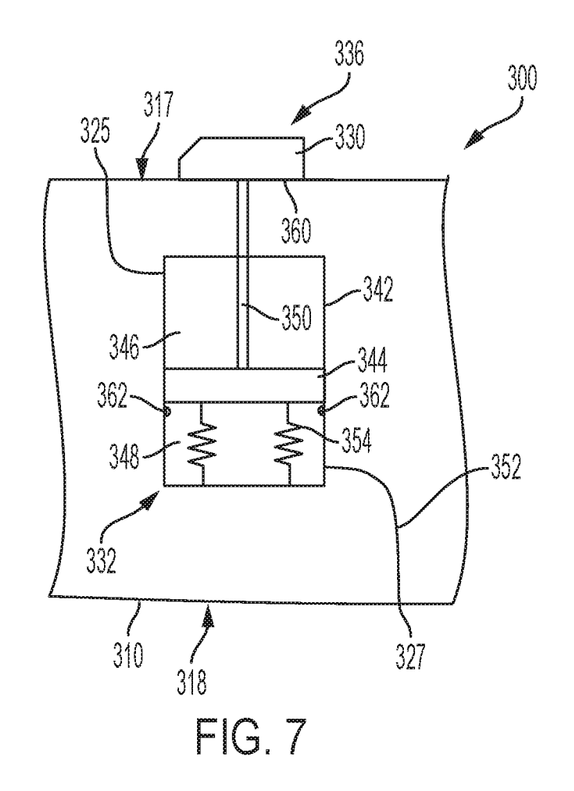
FIG. 7 is a schematic diagram of the system of FIG. 6, with the vortex generator in a deployed mode.

As shown in FIGS. 6-7, this section describes an illustrative vortex generator deployment system 300. System 300 is an example of a passive deployment system as described above. System 300 is configured to passively deploy a vortex generator 330 on an airfoil 310. The system includes a piston 332 with a housing 342 and a dividing seal 344. The seal divides an interior cavity of the housing into a first chamber 346 and a second chamber 348, and is configured to move within the housing while maintaining an airtight seal between the two chambers. Piston 332 may be substantially similar to piston 232 as described above. Accordingly, corresponding components have been assigned a corresponding reference number.

Piston 332 further includes springs 354, which are configured to exert a position-dependent force on dividing seal 344. The springs are disposed in second chamber 348 and urge the seal to return toward a lower end of housing 342, reducing the size of second chamber 348 relative to first chamber 346. Each spring is fixed to the housing at a first end, and to dividing seal 344 at a second end.

Dividing seal 344 is mechanically linked to vortex generator 330. In the present example, piston 332 includes a rod 350. The rod is fixed to dividing seal 344 at a proximal end and fixed to vortex generator 330 at a distal end. Rod 350 extends through first chamber 346 and out of an aperture in housing 342. As dividing seal 344 moves in housing 342, vortex generator 330 may move in response. Piston 332 may therefore move the vortex generator between a stowed position 334, as shown in FIG. 6, and a deployed position 336, as shown in FIG. 7. Vortex generator 330 may move between positions, from an interior of airfoil 310 to the exterior of the airfoil, through an aperture 360 in upper surface 317.

Each of the first and second chambers 346, 348 is in fluid communication with the exterior of airfoil 310. The airfoil has an upper surface 317 and a lower surface 318. An upper pressure port 325 is formed in upper surface 317, through a skin of the airfoil. The upper pressure port is connected by tubing 352 to first chamber 346 of piston 332. A lower pressure port 327 is formed in lower surface 318, through the skin of the airfoil. The lower pressure port is connected by tubing 352 to second chamber 348 of the piston. As a result, first chamber 346 is in fluid communication with an upper airstream proximate upper surface 317 and second chamber 348 is in fluid communication with a lower airstream proximate lower surface 318.

Dividing seal 344 may experience a force resulting from a pressure differential between airstreams at upper surface 317 and lower surface 318. The pressure differential force may urge dividing seal 344 in opposition of springs 354, and toward an upper end of housing 342. Therefore, the pressure differential force may urge vortex generator 330 from stowed position 234 to deployed position 336. Springs 354 may be configured to resist movement of dividing seal 344, and urge the vortex generator 330 to return to the stowed position.

System 300 further includes a pair of detents 362 mounted on the inner wall of housing 342. The detents may be referred to as a trigger device. Detents 362 may comprise any mechanism appropriate to prevent passage of dividing seal 344 along housing 342 until a predetermined net upward force is applied to the seal. The force required to overcome the resistance of the detents may be referred to as the defeating force level. In the present example, detents 362 are spring-operated ball detents.

Dividing seal 344 may be acted on by a net force resulting from the pressure differential force and position dependent force of springs 354. The retaining force of springs 354 may be constant while vortex generator is in the stowed position. Therefore, the net force may surpass the defeating force level of detents 362 when the pressure differential force increases sufficiently. Detents 362 may be configured such that vortex generator 330 is retained in stowed position 234 until airfoil 310 reaches a first selected angle of attack. That is, the detents may be tuned such that dividing seal 344 is prevented from moving until the pressure differential between airstreams at upper surface 317 and lower surface 318 reaches a value corresponding to the first selected angle of attack.

When the first selected angle of attack is reached, and the corresponding pressure differential applied to dividing seal 344, the seal may move past detents 362. The vortex generator may move together with the seal, from stowed position 234 to deployed position 336. Detents 362 may cause the movement of the vortex generator between positions to be quick and complete. The vortex generator may be described as snapping or clicking into the deployed position.

Once the vortex generator has reached the deployed position, piston 332 may hold the vortex generator in the deployed position until the pressure differential force reaches a second threshold value, corresponding to a second selected angle of attack. The detents may prevent downward movement of dividing seal 344 until the pressure differential force decreases sufficiently that the net downward force reaches the defeating force level of the detents. For example, dividing seal 344 may be sized such that detents 362 lock the seal in position. Piston 332 may prevent further upward movement of dividing seal 344. For example, a limiter such as a rim inside housing 342 may prevent further upward motion of the dividing seal. For another example, springs 354 may be configured to prevent additional upward motion of the dividing seal.

In some examples, springs 354 may be configured such that the position dependence of the spring bias force renders the first and second threshold values equal. That is, the springs may be configured such that as the angle of attack increases to the first selected angle the vortex generator will be deployed, and then as the angle of attack returns down to the same selected angle the vortex generator will be re-stowed.

C. Illustrative Latched Passive Deployment System

As shown in FIGS. 8-11, this section describes an illustrative vortex generator deployment system 400. System 400 is an example of a passive deployment system as described above. System 400 is configured to passively deploy a vortex generator 430 on an airfoil 410. The system includes a first piston 432 with a housing 442 and a dividing seal 444. The seal divides an interior cavity of the housing into a first chamber 446 and a second chamber 448, and is configured to move within the housing while maintaining an airtight seal between the two chambers. First piston 432 may be substantially similar to piston 232 as described above. Accordingly, corresponding components have been assigned a corresponding reference number.

Figure 8:
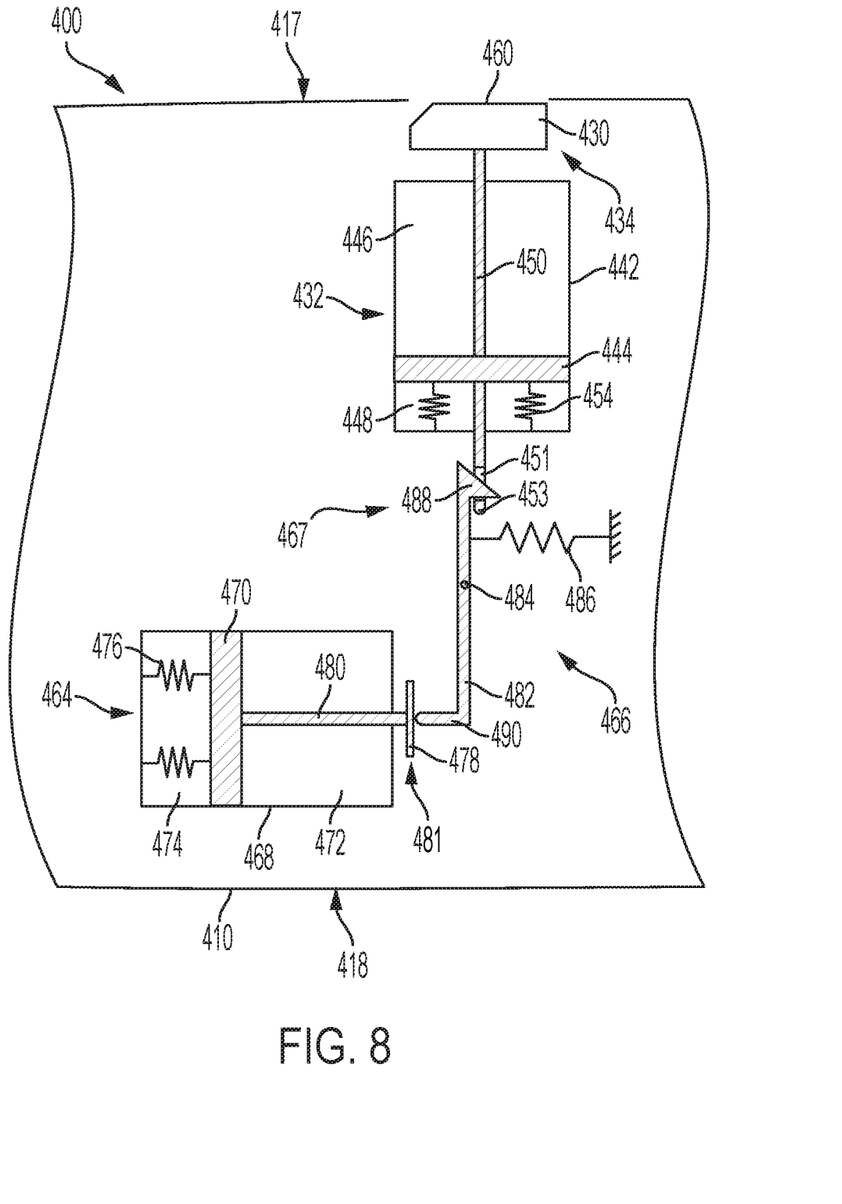
FIG. 8 is a schematic diagram of another illustrative vortex generator passive deployment system as described herein, in a latched mode.
Figure 9:
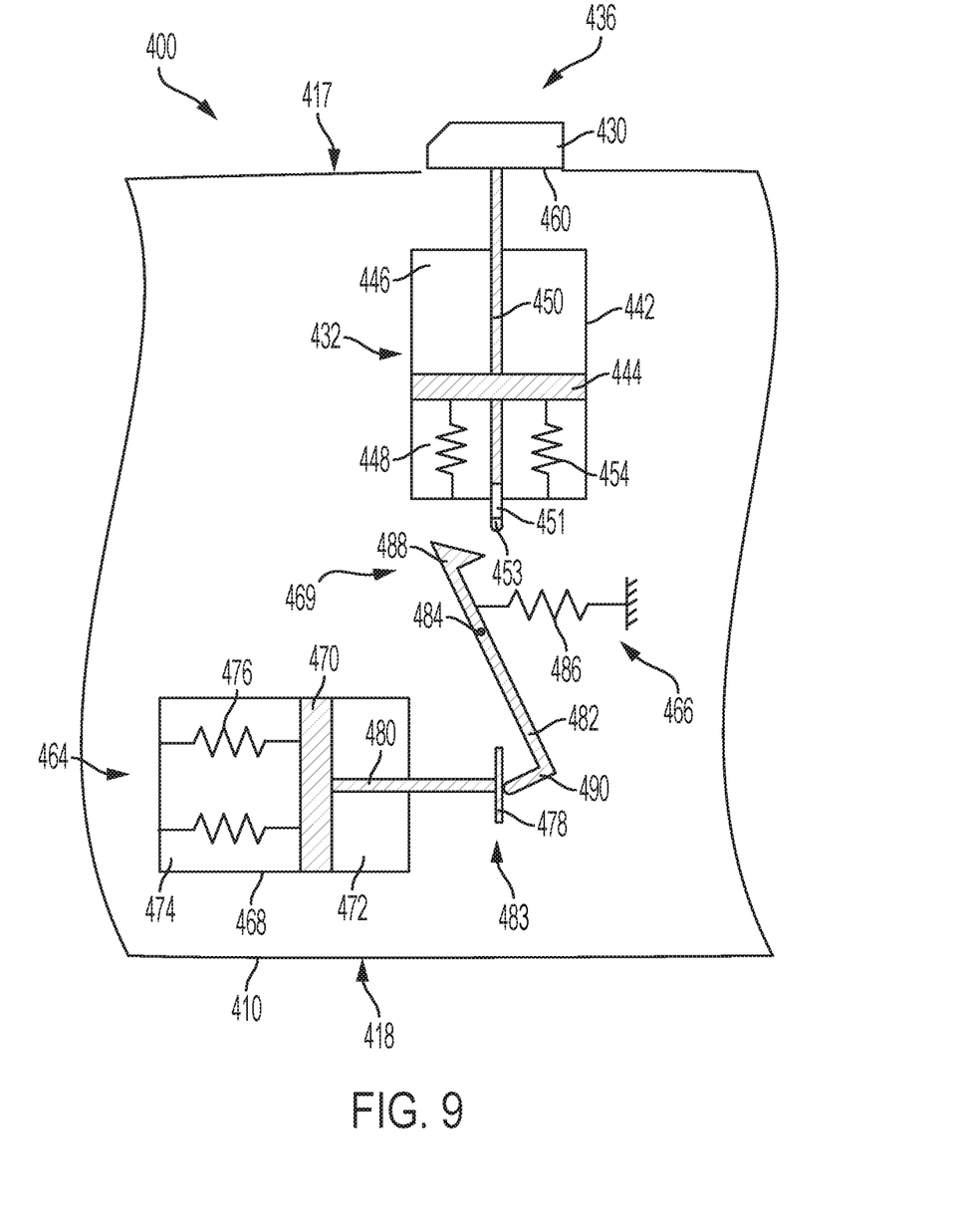
FIG. 9 is a schematic diagram of the system of FIG. 8, in a deployed mode.

First piston 432 further includes springs 454, which are configured to exert a position-dependent force on dividing seal 444. The springs are disposed in second chamber 448 and urge the seal to return toward a lower end of housing 442, reducing the size of second chamber 448 relative to first chamber 446. Each spring is fixed to the housing at a first end, and to dividing seal 444 at a second end.

Dividing seal 444 is mechanically linked to vortex generator 430. In the present example, first piston 432 includes a rod 450. The rod is fixed to vortex generator 430 at a first end and includes a recess or opening 451 at a second end. The second end includes a rounded distal tip 453. A middle portion of rod 450 extends through dividing seal 444 and is fixed to the seal. Rod 450 extends from dividing seal 444 up through first chamber 446 and out of an aperture in an upper end of housing 442. The rod also extends down from dividing seal 444 through second chamber 448 and out of an aperture in a lower end of housing 442. As dividing seal 444 moves in housing 442, vortex generator 430 may move in response. First piston 432 may thereby move the vortex generator between a stowed position 434, as shown in FIG. 8, and a deployed position 436, as shown in FIG. 9. Vortex generator 430 may move between positions, from an interior of airfoil 410 to the exterior of the airfoil, through an aperture 460 in upper surface 417.

Each of the first and second chambers 446, 448 is in fluid communication with the exterior of airfoil 410. The airfoil has an upper surface 417 and a lower surface 418. First chamber 446 is in fluid communication with an upper airstream proximate upper surface 417 and second chamber 448 is in fluid communication with a lower airstream proximate lower surface 418. In FIGS. 8-11, connection between the chambers and the airfoil exterior is not depicted, but may be accomplished by tubing and/or any effective means.

Dividing seal 444 may experience a force resulting from a pressure differential between airstreams at upper surface 417 and lower surface 418. The pressure differential force may urge dividing seal 444 in opposition of springs 454, and toward an upper end of housing 442. Therefore, the pressure differential force may urge vortex generator 430 from stowed position 434 to deployed position 436. Springs 454 may be configured to resist movement of dividing seal 444, and urge vortex generator 430 to return to the stowed position.

System 400 further includes a second piston 464 and a latch device 466. Second piston 464 may be substantially similar to first piston 432 as described above. Second piston 464 includes a housing 468 and a dividing seal 470. The seal divides an interior cavity of the housing into a first chamber 472 and a second chamber 474, and is configured to move within the housing while maintaining an airtight seal between the two chambers. Second piston 464 further includes springs 476, which are configured to exert a position-dependent force on dividing seal 470. The springs are disposed in second chamber 474 and urge the seal to return toward one end of housing 468. Each spring is fixed to the housing at a first end, and to dividing seal 470 at a second end.

Dividing seal 470 is mechanically linked to an engaging plate 478. In the present example, second piston 464 includes a rod 480. The rod is fixed to dividing seal 470 at a proximal end and fixed to plate 478 at a distal end. Rod 480 extends through first chamber 472 and out of an aperture in housing 468. As dividing seal 470 moves in housing 468, plate 478 may move in response. Second piston 464 may therefore move the vortex generator between a retracted position 481, as shown in FIG. 8, and an extended position 483, as shown in FIG. 9.

Each of the first and second chambers 472, 474 is in fluid communication with the exterior of airfoil 410. First chamber 472 is in fluid communication with the upper airstream proximate upper surface 417 and second chamber 448 is in fluid communication with the lower airstream proximate lower surface 418. In FIGS. 8-11, connection between the chambers and the airfoil exterior is not depicted, but may be accomplished by tubing and/or any effective means. In some examples, the chambers of first piston 432 and second piston 464 may be connected to a shared pair of pressure ports in the exterior surface of the airfoil. In some examples, each piston may be connected to a separate pair of pressure ports. Chord-wise location and/or joint connection of the pressure ports may be determined by a desired response of the first and second pistons, as described further below.

Dividing seal 470 may experience a force resulting from a pressure differential between airstreams at upper surface 417 and lower surface 418. The pressure differential force may urge dividing seal 470 in opposition of springs 476, and toward an opposite end of housing 468. The pressure differential force may thereby urge plate 478 from retracted position 481 to extended position 483. Springs 476 may be configured to resist movement of dividing seal 470, and urge the plate to return to the retracted position. Response of second piston 464 to a given pressure differential may differ from the response of first piston 432 to the same pressure differential. For example, housing 468 of the second piston may be larger or smaller than housing 442 of the first piston, or springs 454 of the second piston may have a different spring coefficient than springs 454 of the first piston. Second piston 464 may be configured to return plate 478 to the retracted position at a higher pressure differential than first piston is configured to begin returning vortex generator 430 toward the stowed position. Alternatively or additionally, second piston 464 may be connected to different pressure ports then first piston 432, the pressure ports being disposed at a different location on airfoil 410 and second piston 464 responding to a lower pressure differential. In effect, as the angle of attack of airfoil 410 decreases, plate 478 may return to the retracted position before vortex generator 430 returns to the stowed position, as described further with reference to FIG. 10, below.

Latch device 466, which may be referred to as a trigger device, includes a latch bar 482 mounted on a pivot 484. The pivot may be fixed relative to airfoil 410. For example, the pivot may be mounted to an internal structure of the airfoil, such as a wing rib or spar. Latch bar 482 may be free to pivot about pivot 484, apart from a biasing latch spring 486. A first end of latch spring 486 is fixed to latch bar 482, and a second end of the spring is fixed to an internal structure of the airfoil. Latch spring may be configured to return latch bar 482 to an upright position, as shown in FIG. 8. Latch bar 482 is elongate, including a ramped end 488 and a protruding end 490. Protruding end 490 is configured to engage plate 478. Ramped end 488 is configured to engage rod 450 of first piston 432.

Consider the response of system 400 as airfoil 410 increases attack angle from a minimum to a maximum value, and then returns to the minimum value. For example, consider the system response to takeoff and then leveling out of a plane. FIG. 8 depicts the system at the initial minimum attack angle, in what may be described as a latched configuration. Vortex generator 430 is in stowed position 434, and plate 478 is in retracted position 481. Latch bar 482 is upright, with protruding end 490 proximate plate 478. The protruding end and plate may be in contact, or spaced from one another. Ramped end 488 extends through opening 451 of rod 450, restraining motion of the rod and thereby retaining vortex generator 430 in the stowed position. Latch bar 482 may be described as in a latched position 467.

As the angle of attack increases, and therefore the pressure differential between the airstreams at upper surface 417 and lower surface 418 of airfoil 410 increases, second piston 464 may move plate 478 toward extended position 483. Plate 478 may engage protruding end 490 of latch bar 482, causing the latch bar to pivot. While ramped end 488 remains engaged with opening 451 of rod 450, vortex generator 430 may remain in stowed position 434. As latch bar 482 pivots, ramped end 488 may be retracted from opening 451, until at a critical point rod 450 may be released. Latch bar 482 may be described as in an unlatched position 469. The critical point may be at a critical or first threshold value of the pressure differential, and correspond to a first selected angle of attack.

When rod 450 is released by latch bar 482, the angle of attack and pressure differential acting on first piston 432 may be sufficient to immediately fully deploy vortex generator 430. That is, as soon as the rod is released, the vortex generator may snap from stowed position 434 to deployed position 436. FIG. 9 depicts system 400 immediately after such release of rod 450, in what may be referred to as an unlatched configuration.

Figure 10:
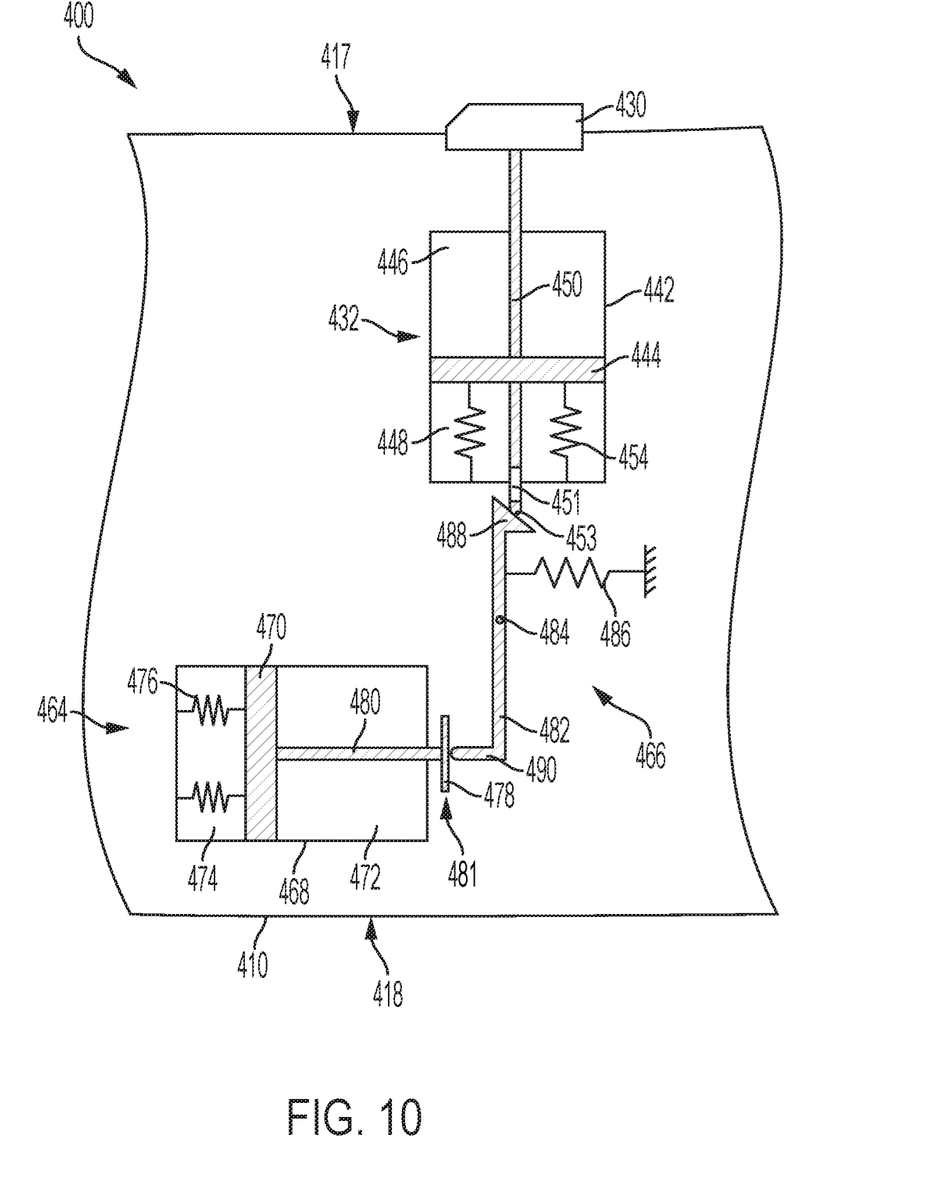
FIG. 10 is a schematic diagram of the system of FIG. 8, in a transitional mode.

As the angle of attack decreases again, and the pressure differential between the airstreams at upper surface 417 and lower surface 418 of airfoil 410 decreases, second piston 464 may move plate 478 back toward retracted position 481. Second piston 464 may move independently of first piston 432, such that plate 478 returns to retracted position 481 before vortex generator 430 begins to move toward and/or returns to the stowed position. As shown in FIG. 10, latch bar 482 may be returned to upright by latch spring 486. First piston 432 may move vortex generator 430 back toward stowed position 434, until rod 450 contacts ramped end 488.

Figure 11:
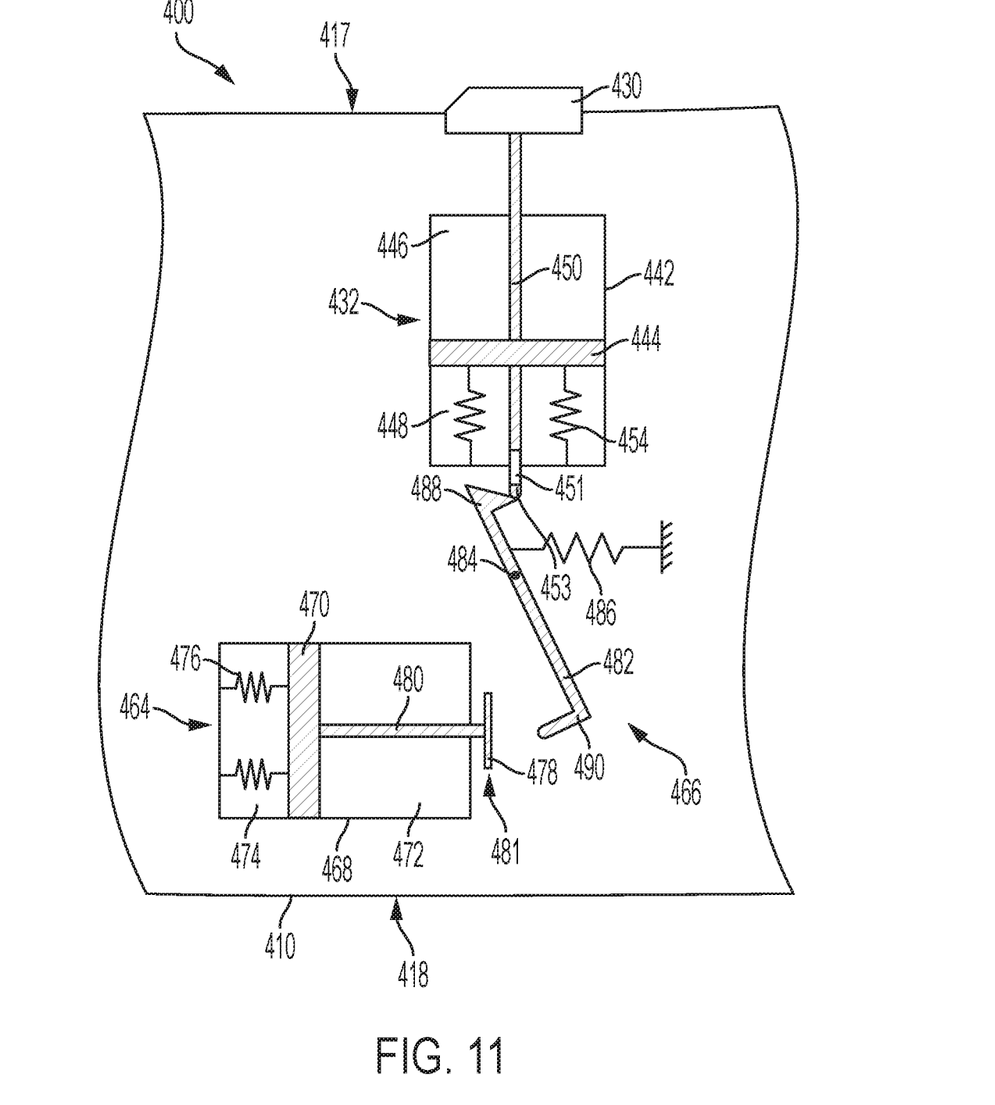
FIG. 11 is another schematic diagram of the system of FIG. 8, in the transitional mode.

As the angle of attack continues to decrease, first piston 432 may urge rod 450 downward. Rounded distal tip 453 of rod 450 may slide along an upper surface of ramped end 488, causing latch bar 482 to pivot, as shown in FIG. 11. The distal tip may also be described as travelling along a ramped surface of latch bar 482. At a critical point, latch bar 482 may pivot sufficiently to allow rounded distal tip 453 of rod 450 to pass ramped end 488, and the ramped end to re-engage opening 451 of the rod. The critical point may be at a critical or second threshold value of the pressure differential, and correspond to a second selected angle of attack. System 400 may be thereby returned to the latched configuration, as shown in FIG. 8.

D. Illustrative Method

Figure 12:
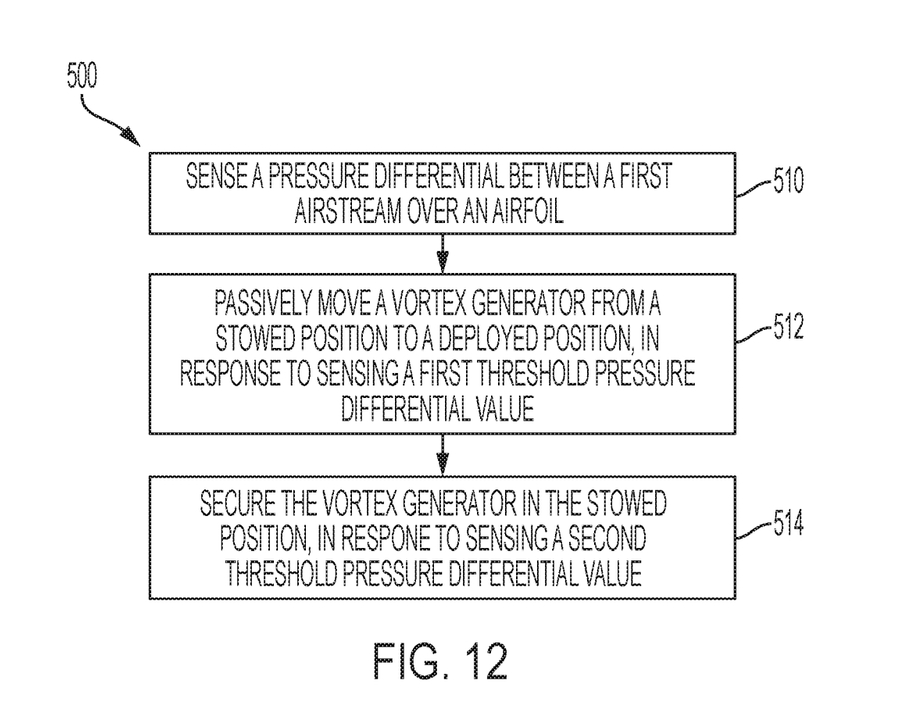
FIG. 12 is a flowchart depicting steps of an illustrative method of deploying a vortex generator, according to the present teachings.

This section describes steps of an illustrative method 500 for deploying a vortex generator; see FIG. 12. Aspects of passive deployment systems described above may be utilized in the method steps described below. Where appropriate, reference may be made to components and systems that may be used in carrying out each step. These references are for illustration, and are not intended to limit the possible ways of carrying out any particular step of the method.

FIG. 12 is a flowchart illustrating steps performed in an illustrative method, and may not recite the complete process or all steps of the method. Although various steps of method 500 are described below and depicted in FIG. 12, the steps need not necessarily all be performed, and in some cases may be performed simultaneously or in a different order than the order shown.

At step 510, the method includes sensing a pressure differential between a first airstream and a second airstream over an airfoil. The first airstream may be over a first external surface of the airfoil, and the second airstream may be over a second, opposing external surface of the airfoil. The airfoil may be an aircraft wing, turbine rotor, and/or any aerodynamic structure which is susceptible to boundary layer separation and on which selective deployment of a vortex generator is desirable.

Sensing the pressure differential may include placing first and second chambers of a piston in fluid communication with the first and second airstreams. For example, the fluid communication may be achieved through pinhole apertures in the external surfaces of the airfoil and tubing from the apertures to the piston. The first chamber of the piston may be in fluid communication with the first airstream, and the second chamber of the piston may be in fluid communication with the second airstream, such that the pressure differential between the first and second airstreams acts as a directional force on a head of the piston.

Step 512 of the method includes passively moving a vortex generator from a stowed position to a deployed position, in response to sensing a first threshold pressure differential value. The vortex generator may be mechanically linked to the head of the piston, such that movement of the piston head causes the vortex generator to move between the stowed and deployed positions. The piston may be biased against the directional force on the piston head resulting from the pressure differential. For example, springs mounted in the piston may restrain movement of the piston head. The springs may react the directional force on the piston head up to the first threshold pressure differential value. In some example a trigger device such as a latch or detents may prevent movement of the piston head until the first threshold pressure differential value is reached. Once the first threshold value is reached, the directional force resulting from the pressure differential may passively and automatically move the vortex generator toward the deployed position.

Step 512 may include activating or actuating a trigger device. For example, the passively moving the vortex generator may include overcoming detents impeding motion of the piston head and/or may include releasing a latch restraining motion of the piston head.

Step 512 may be described as being substantially instantaneously triggered. That is, the passive movement of the vortex generator may be instantaneously triggered in response to sensing the first pressure differential threshold value. Substantially instantaneously triggering the step may comprise initiating the passive movement without delay for communication, processing, and/or analysis of the sensed pressure differential value. Substantially instantaneously triggering the step may comprise automatically initiating the passive movement without delay for an initiation signal from a control system and/or user of a passive deployment system.

At step 514, the method includes securing the vortex generator in the stowed position, in response to sensing a second threshold pressure differential value. The second threshold pressure differential value may be lower than the first threshold pressure differential value. The directional force on the head of the piston resulting from the second threshold pressure differential value may therefore be less than that resulting from the first threshold value. The piston may be biased such that the biasing force overcomes the directional force resulting from the pressure differential at the second threshold value. The biasing force may then move the piston head such that the linked vortex generator is returned to the stowed position.

Securing the vortex generator may include activating or actuating a trigger device. For example, the securing the vortex generator may include overcoming detents positioned to trap the piston head and/or may include engaging a latch configured to restrain motion of the piston head.

The first and second pressure differential threshold values may be selected. The values may be selected according to corresponding angles of attack, such that movement of the vortex generator between stowed and deployed positions occurs in response to changes in angle of attack of the airfoil. For example, for an aircraft wing the threshold values may be selected such that step 512 is performed prior to takeoff and approach to landing, and step 514 may be performed as the plane levels off at cruising altitude.

E. Illustrative Aircraft and Associated Method

Figure 13:
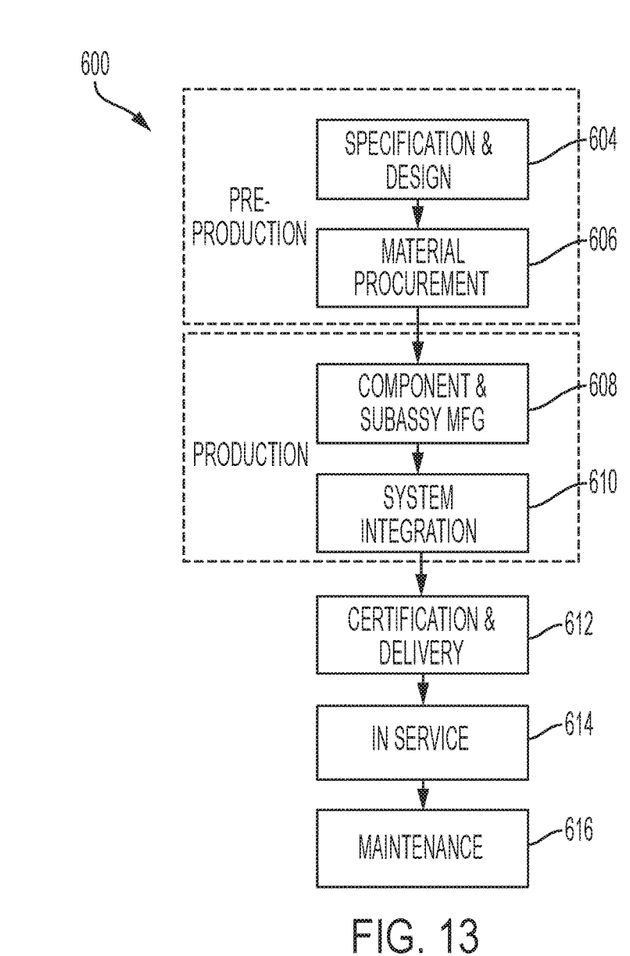
FIG. 13 is a flowchart depicting steps of an illustrative aircraft manufacturing and service method.
Figure 14:
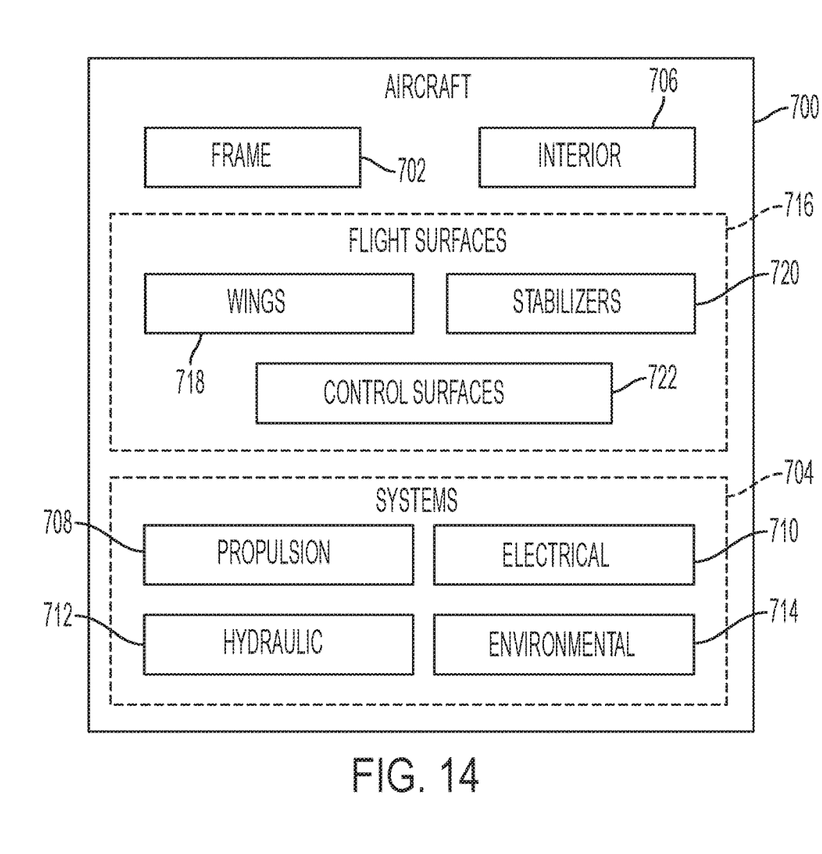
FIG. 14 is a schematic diagram of an illustrative aircraft.

Examples disclosed herein may be described in the context of an illustrative aircraft manufacturing and service method 600 (see FIG. 13) and an illustrative aircraft 700 (see FIG. 14). Method 600 includes a plurality of processes, stages, or phases. During pre-production, method 600 may include a specification and design phase 604 of aircraft 700 and a material procurement phase 606. During production, a component and subassembly manufacturing phase 608 and a system integration phase 610 of aircraft 700 may take place. Thereafter, aircraft 700 may go through a certification and delivery phase 612 to be placed into in-service phase 614. While in service (e.g., by an operator), aircraft 700 may be scheduled for routine maintenance and service 616 (which may also include modification, reconfiguration, refurbishment, and so on of one or more systems of aircraft 700). While the examples described herein relate generally to operational use during in-service phase 614 of aircraft 700, they may be practiced at other stages of method 600.

Each of the processes of method 600 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 14, aircraft 700 produced by illustrative method 600 may include a frame 702 with, a plurality of flight surfaces 716, a plurality of systems 704, and an interior 706. Examples of plurality of flight surfaces 716 include one or more of wings 718, horizontal and/or vertical stabilizers 720, and control surfaces 722 such as flaps, ailerons, and elevators. Any number of other flight surfaces may be included. Examples of plurality of systems 704 include one or more of a propulsion system 708, an electrical system 710, a hydraulic system 712, and an environmental system 714. Each system may comprise various subsystems, such as controllers, processors, actuators, effectors, motors, generators, etc., depending on the functionality involved. Any number of other systems may be included.

Although an aerospace example is shown, the principles disclosed herein may be applied to other industries, such as the automotive industry, rail transport industry, and nautical engineering industry. Accordingly, in addition to aircraft 700, the principles disclosed herein may apply to other vehicles, e.g., land vehicles, marine vehicles, etc.

Apparatuses and methods shown or described herein may be employed during any one or more of the stages of the aircraft manufacturing and service method 600. For example, components or subassemblies corresponding to component and subassembly manufacturing phase 608 may be fabricated or manufactured in a manner similar to components or subassemblies produced while aircraft 700 is operating during in-service phase 614. Also, one or more examples of the apparatuses, methods, or combinations thereof may be utilized during manufacturing phase 608 and system integration phase 610, for example, by substantially expediting assembly of or reducing the cost of aircraft 700. Similarly, one or more examples of the apparatus or method realizations, or a combination thereof, may be utilized, for example and without limitation, while aircraft 700 is in in-service phase 614 and/or during maintenance and service phase 616.

Advantages, Features, and Benefits

The different examples of vortex generator passive deployment systems and methods described herein provide several advantages over known solutions for mounting or deploying vortex generators. For example, illustrative examples described herein allow vortex generators to deploy passively, without a control system.

Additionally, and among other benefits, illustrative examples described herein allow automatic re-stowage of deployed vortex generators.

Additionally, and among other benefits, illustrative examples described herein allow deployment of vortex generators based on an airfoil's angle of attack.

Additionally, and among other benefits, illustrative examples described herein allow selection of a desired threshold angle of attack for deployment and stowage of vortex generators.

Additionally, and among other benefits, illustrative examples described herein use simple, inexpensive, and reliable mechanical components.

No known system or device can perform these functions, particularly without an electrical power supply. The illustrative examples described herein are particularly useful for aircraft. However, not all examples described herein provide the same advantages or the same degree of advantage.

CONCLUSION

The disclosure set forth above may encompass multiple distinct examples with independent utility. Although each of these has been disclosed in its preferred form(s), the specific examples thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A system for passive deployment of a vortex generator, comprising:
    a first housing mounted at a fixed location relative to an airfoil structure,
    a first piston contained in the first housing, and
    a vortex generator moveably mounted adjacent an exterior surface of the airfoil structure, the vortex generator being moveable between a stowed position inside the airfoil structure, and a deployed position outside the airfoil structure,
    wherein the first piston is configured to drive the vortex generator between the stowed position and the deployed position by a pressure differential between a first airstream over a first surface of the airfoil structure and a second airstream over a second surface of the airfoil structure.

2. The system of claim 1, wherein the first piston is spring biased to urge the vortex generator toward the stowed position.

3. The system of claim 1, further comprising:
    a trigger device configured to release the vortex generator from the stowed position to the deployed position at a first threshold value of the pressure differential.

4. The system of claim 3, wherein the trigger device is configured to reengage the first piston to secure the vortex generator in the stowed position at a second threshold value of the pressure differential.

5. The system of claim 4, further comprising:
    a second housing mounted at a fixed location relative to the airfoil structure, and
    a second piston contained in the second housing,
    wherein the trigger device includes a latch device configured to engage and disengage from an extension portion of the first piston, the second piston being configured to move the latch device between a latched position engaged with the extension portion of the first piston, and an unlatched position disengaged from the extension portion of the first piston, in response to a pressure differential between a third airstream over a third surface of the airfoil structure and a fourth airstream over a fourth surface of the airfoil structure.

6. The system of claim 5, wherein the first and third surfaces are the same, the second and fourth surfaces are the same, and the first and second pistons are responsive to the same pressure differential.

7. The system of claim 5, wherein the second piston is spring biased to urge the latch device toward the latched position.

8. The system of claim 3, wherein the first threshold value of the pressure differential is selected to cause deployment of the vortex generator as an aircraft approaches a critical angle of attack.

9. The system of claim 3, wherein the trigger device includes a spring biased hinge mechanism.

10. The system of claim 3, wherein the first piston is connected to a rod having a rounded distal tip, the trigger device having a ramp surface, and the rounded distal tip of the rod being configured to travel along the ramp surface as the vortex generator moves toward the stowed position.

11. The system of claim 1, wherein the first and second surfaces are on opposite sides of an aircraft wing.

12. An aircraft, comprising:
    a fuselage,
    an airfoil structure connected to the fuselage,
    a first housing mounted at a fixed location relative to the airfoil structure,
    a first piston contained in the first housing, and
    a vortex generator moveably mounted adjacent an exterior surface of the airfoil structure, the vortex generator being moveable between a stowed position inside the airfoil structure and a deployed position outside the airfoil structure,
    wherein the first piston is configured to drive the vortex generator between the stowed position and the deployed position by a pressure differential between a first airstream over a first surface of the airfoil structure and a second airstream over a second surface of the airfoil structure.

13. The aircraft of claim 12, wherein the first piston is spring biased to urge the vortex generator toward the stowed position.

14. The aircraft of claim 12, further comprising:
a trigger device configured to release the vortex generator from the stowed position to the deployed position at a first threshold pressure differential between the first airstream and the second airstream.

15. The aircraft of claim 14, wherein the trigger device is configured to reengage the first piston to secure the vortex generator in the stowed position at a second threshold pressure differential between the first airstream and the second airstream.

16. The aircraft of claim 15, further comprising:
a second housing mounted at a fixed location relative to the airfoil structure, and
a second piston contained in the second housing,
wherein the trigger device includes a latch device configured to engage and disengage from an extension portion of the first piston, the second piston being configured to move the latch device between a latched position engaged with the extension portion of the first piston, and an unlatched position disengaged from the extension portion of the first piston, in response to a pressure differential between a third airstream over a third surface of the airfoil structure and a fourth airstream over a fourth surface of the airfoil structure.

17. The aircraft of claim 16, wherein the first and third surfaces are the same, the second and fourth surfaces are the same, and the first and second pistons are responsive to the same pressure differential.

18. A method of deploying a vortex generator, comprising:
exposing a passive deployment system of a vortex generator to a pressure differential between a first airstream over a first surface of an airfoil structure and a second airstream over a second surface of the airfoil structure, and
allowing the vortex generator to be moved from a stowed position to a deployed position in the first airstream by the pressure differential, when the pressure differential has a selected first threshold value.

19. The method of claim 18, wherein the passive deployment system is substantially instantaneously triggered by the selected first threshold value of the pressure differential.

20. The method of claim 18, further comprising:
allowing the vortex generator to be secured in the stowed position by a selected second threshold value of the pressure differential.

* * * * *